United States Patent [19]

Dahan et al.

[11] Patent Number: 5,703,981
[45] Date of Patent: Dec. 30, 1997

[54] PRE-TERMINATED OPTICAL FIBERS

[75] Inventors: Michael Dahan, Columbia; John M. Ehrenreich, Catonsville, both of Md.

[73] Assignee: Fiber-Conn Assemblies, Inc., Hanover, Md.

[21] Appl. No.: 355,161

[22] Filed: Dec. 8, 1994

[51] Int. Cl.$^6$ .................................................. G02B 6/36
[52] U.S. Cl. .................................. 385/78; 385/60; 385/72; 385/85
[58] Field of Search ........................ 385/78, 84, 85, 385/60, 72, 116

[56] References Cited

U.S. PATENT DOCUMENTS

| | | | |
|---|---|---|---|
| 4,330,171 | 5/1982 | Malsot et al. | 385/80 |
| 4,689,005 | 8/1987 | Plummer | 425/451.9 |
| 4,815,809 | 3/1989 | Szostak | 385/84 |
| 4,911,518 | 3/1990 | Miller | 385/78 |
| 5,071,218 | 12/1991 | Nishimoto | 385/60 |
| 5,193,133 | 3/1993 | Schofield et al. | 385/85 |
| 5,278,928 | 1/1994 | Ueda et al. | 385/78 |
| 5,367,596 | 11/1994 | Chow | 385/116 |

*Primary Examiner*—Phan T. H. Palmer
*Attorney, Agent, or Firm*—Howard L. Rose

[57] ABSTRACT

A termination ferrule body with a ferrule for an optical fiber is molded directly about the optical fiber employing a mold insert defining a hole in the insert that precisely locates the optical fiber in the center of the end of the ferrule.

5 Claims, 2 Drawing Sheets

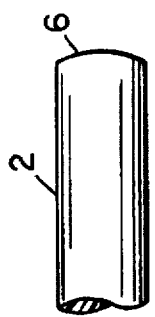
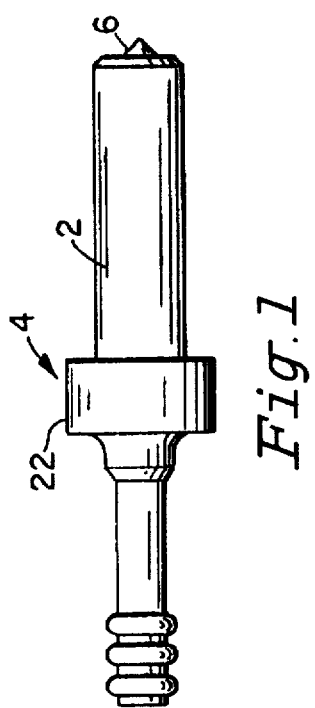
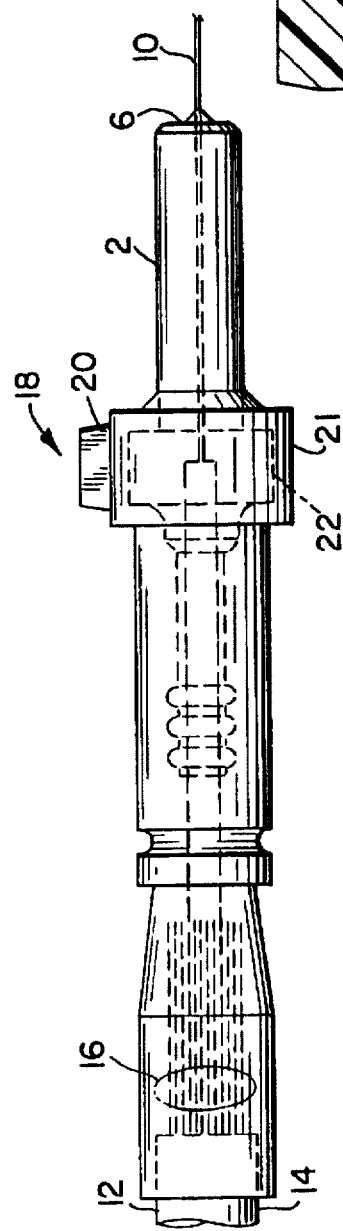
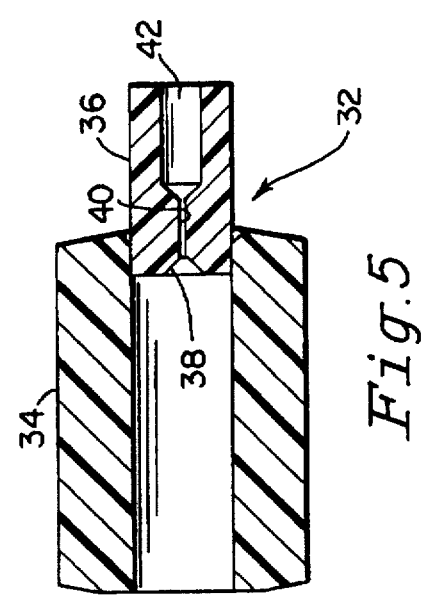

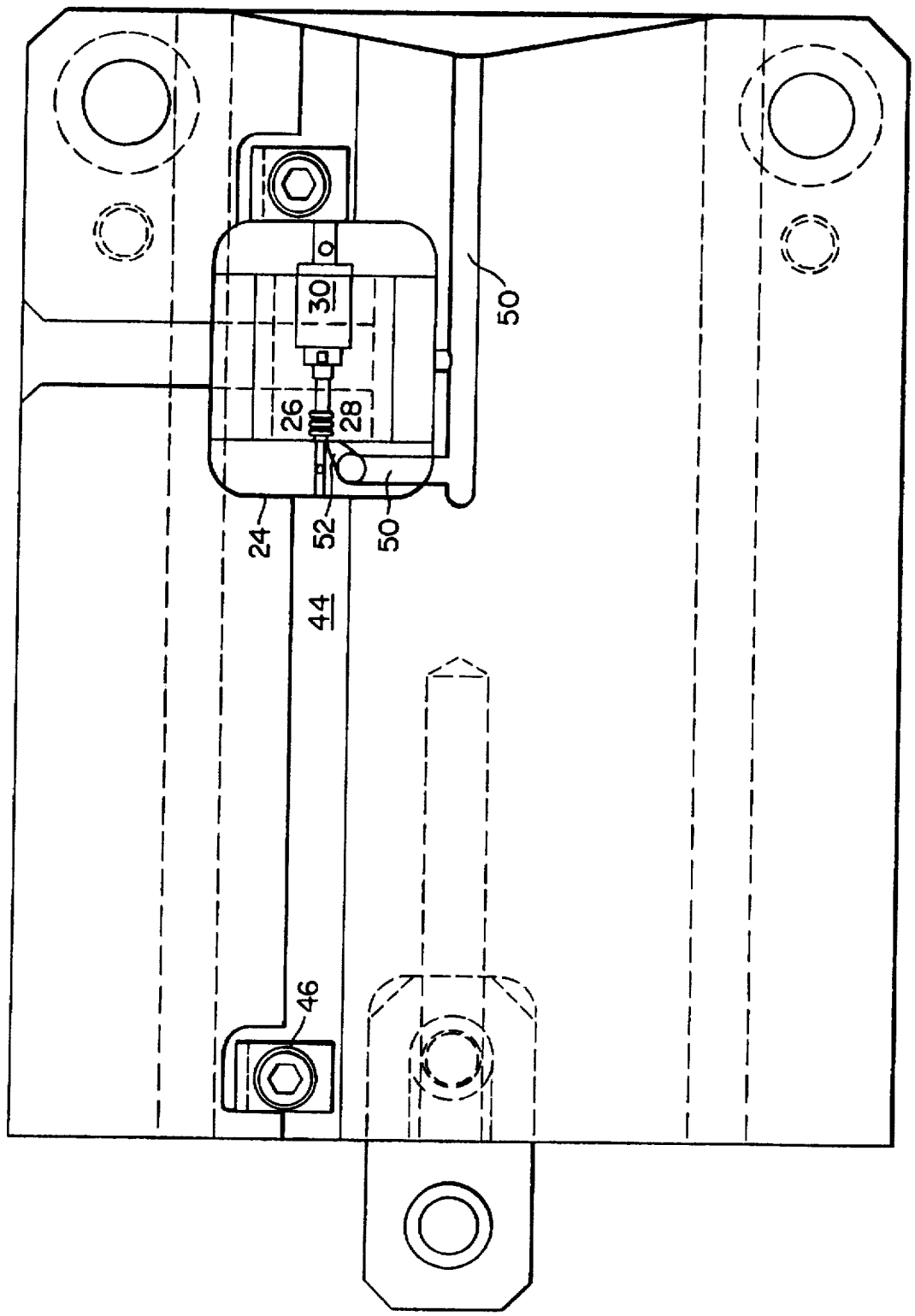

PRE-TERMINATED OPTICAL FIBERS

FIELD OF THE INVENTION

The present invention relates to terminations for optical fibers and more particularly to the formation of a termination ferrule directly about an optical fiber it is to terminate.

BACKGROUND OF THE INVENTION

Presently the ferrules for terminating optical fibers are molded and then the optical fiber is inserted. There are many disadvantages to such a method. The procedure is highly labor intensive, costly and slow. Each ferrule must be made with a high precision hole increasing the loss rate of incorrectly manufactured ferrules beyond desired limits. Further assembly of ferrule and fiber is time consuming. Typical assembly rates are 100 terminated fibers per hour.

OBJECTS OF THE INVENTION

It is a primary object of the present invention to mold a fiber optic connector, a ferrule, directly about an optical fiber.

It is another object of the present invention to render manufacture of an optical fiber with a ferrule connector relatively simple and at a relatively high assembly rate.

It is still another object of the present invention to mold a termination ferrule directly about an optical fiber at rates as high as 960 per hour.

Still another object of the present invention is to mold a termination ferrule for an optical fiber directly about the fiber whereby a precisely located hole is not required for each individually, separately produced ferrule but only one precisely located hole is required, this for the mold in which each ferrule is formed.

BRIEF DESCRIPTION OF THE PRESENT INVENTION

In accordance with the present invention a mold is produced having inner dimensions of the desired outer dimensions of a termination ferrule to be fabricated in the mold. The mold has a precisely located hole at the apex of a conical bore in the end of the mold so that the optical fiber is directed into a precisely located hole in the center of the mold. A liquid crystal polymer is then injected into the mold, allowed to cool to setting temperature and the ferrule with the optical fiber precisely located therein may be withdrawn from the mold.

The above procedure eliminates the requirement for producing each individual ferrule with a precisely located hole since such is produced with a single mold having a precisely located hole.

The mold is, in effect, a hollow cylinder; that is, not two mating halves, whereby no parting lines are formed along the length of the ferrule that would have to be removed after the molding operation is completed. The mold, instead, is held with its rear circular surface pressed tightly against the injection molding machine so that if a parting line is formed it is perpendicular to the longitudinal axis of the ferrule in a region that cannot affect its performance.

A heat activated mastic may be applied to the outer surface of the fiber to better bind it to the ferrule. Also Kevlar fibers may be bonded to the molded plastic ferrite body at a location somewhat remote from the ferrule to reinforce the fiber interiorly of its cable.

The above and other features, objects and advantages of the present invention, together with the best means contemplated by the inventor thereof for carrying out the invention will become more apparent from reading the following description of a preferred embodiment and perusing the associated drawings in which:

BRIEF DESCRIPTION OF THE DRAWINGS

FIG. 1 illustrates the ferrule and ferrule body of the present invention;

FIG. 2 illustrates the finished end of the ferrule;

FIG. 3 illustrates the final structure for an ST Body;

FIG. 4 illustrates the mold employed to produce the ferrule and ferrule body of FIG. 1; and FIG. 5 illustrates the mold insert employed to produce the ferrule of the ferrule body.

DETAILED DESCRIPTION OF THE PRESENT INVENTION

Referring specifically to FIG. 1 of the accompanying drawings, there is illustrated the ferrule, ferrule body and the optical fiber about which the ferrule and ferrule body are to be molded.

The ferrule 2 of ferrule body 4 is illustrated as it comes out of the mold. End 6 of the ferrule 2 is ground and polished to the rounded shape illustrated in FIG. 2 with a mirror finish.

The structure illustrated in FIG. 1 must be adapted to fit a standard fiber optic termination body such as an ST Body. Such a body is illustrated in FIG. 3. The completed structure in such case is illustrated as having a cable 12 with outer shield 14. The shield 14 is removed to expose optical fiber 10 and if used Kevlar reinforcing fibers 16. ST Body 18 includes a key 20 for alignment in a termination assembly. The key 20 extends from a cylindrical body 21 disposed about a region 22 of the ferrule body 4 to retain the ferrule body on the ST Body 18.

To produce the final structure illustrated in FIG. 3, preferably the ferrule body with ferrule, the ferrule body is molded and then the ST Body is molded about the ferrule body. In other configurations the ferrule body and the outer body may be formed in a single molding operation. The ST Body and ferrule body may also be fabricated in a single molding operation but less expensive molds may be used if the molding of the two bodies are performed separately.

Referring now to FIG. 4 of the accompanying drawings, the structure of the mold for forming the ferrule body 4 is illustrated. A mold 24 is comprised of upper half 26 and a lower half 28. The interior of the mold is in the shape of the ferrule body illustrated in FIG. 1 except for the interior of a rectangular region 30. Located within the rectangular area 30 is a ferrule mold insert 32. See FIG. 5.

Referring now to FIG. 5 of the accompanying drawings, located within the rectangular region 30 is a hollow cylinder 34 and force fitted into the right end as viewed in FIG. 5 is a plug 36 in which the interior of an end has a conical bevel 38 with a precisely located hole 40 passing through the apex of the conical bevel 38. The hole 40 extends into an expanded region 42 for purposes to become apparent in the continued description of FIG. 4.

Referring again to FIG. 4, a cable (not illustrated) is inserted into a passage 44 and tightly held by a clamp 46. The end of the outer members of the cable have been previously removed to expose the optical fiber 10 to the extent necessary for the fiber to extend through the mold and to a clamp 48 to hold the optical fiber. The fiber is threaded through the mold and most importantly through the assembly of FIG. 5 situated in the rectangular region 30 of the mold. The enlarged region of the plug 36 is to permit manipulating of the fiber 10 during the clamping operation without fear of breaking the fiber on a sharp edge of the plug. The fiber 10 is preferably placed under tension and the molding process is commenced. Specifically a liquid crystal polymer is pumped into a passage 50 of the mold body to a nozzle 52 which projects the polymer into the mold cavity. The polymer is injected at the back of the mold cavity, that is, the end of the cavity remote from the ferrule. Slow flow through the mold cavity is intended to maintain the fiber substantially straight; this being assisted by the fact that the polymer shrinks on cooling. When the molding operation is completed, the two halves of the mold are separated and the optical fiber is released from the clamp 48. The mold insert 34 is then pulled off the ferrule with the fiber embedded therein. The end of the ferrule is then ground and polished to a mirror finish and the process is complete. In use, the loss of signal at the connector interface is below 1 db.

The mold is preferably made of stainless steel. The size of the interior of the cylinder 34 must be only moderately precise but the size and location of the hole 40 must be to the utmost precision. It is anticipated that four and eight cavity molds will be used to achieve the production rate of 960 units per hour.

Various size fibers are readily accommodated by simply changing the plug to provide a hole of a different size. The entire mold insert 34 may also be replaced. Outer diameters can vary but at this time 125 μm is most common.

It can be seen that for each ferrule with a given size only one precisely located hole for production of thousands of ferrules is required. Of course, if several molds are used then each plug must have a precisely located hole. The tolerances on hole size and hole location are within 3 μm and concentric to the inner diameter of the sleeve within 1.3 μm. The liquid crystal polymer is purchased from E.I. dupont de Nemours & Co. under the name Zenite LCP Type 6130. Other polymers may be used but presently the named plastic is considered to be the preferred material.

Once given the above disclosure, many other features, modifications and improvements will become apparent to the skilled artisan. Such features, modifications and improvements are, therefore, considered to be a part of this invention, the scope of which is to be determined by the following claims.

What is claimed is:

1. An optical fiber termination structure comprising
   an optical fiber,
   a ferrule body having a ferrule,
   said ferrule body molded to said optical fiber.

2. An optical fiber termination structure according to claim 1 wherein
   said optical fiber extends axially through said ferrule body and to the end of said ferrule,
   said optical fiber passing axially through the ferrule and being located precisely at the center of the end of said ferrule.

3. An optical fiber termination structure according to claim 2 wherein
   said ferrule body and said optical fiber are highly polished at the end of said ferrule.

4. An optical fiber termination structure according to claim 2 further comprising
   a hollow mold having a precisely located central hole in a wall in one end and an open end at another end
   said optical fiber extending from the open end through the precisely located hole.

5. An optical fiber termination structure produced by the following process:
   inserting an optical fiber into a hollow axially elongated mold having a precisely centrally located hole at one end and an open end at the other end,
   inserting an optical fiber into the open end, through the mold and through the precisely located hole,
   said fiber having an outside diameter substantially equal to the inside diameter of said centrally located hole,
   injecting a desired ferrule material into said mold about said optical fiber to bond to said fiber, and
   polishing the end of the fiber.

* * * * *